US009181960B2

(12) United States Patent
Kowalak et al.

(10) Patent No.: US 9,181,960 B2
(45) Date of Patent: Nov. 10, 2015

(54) GUIDE LINER FOR BREAK-AWAY FITTING

(75) Inventors: Mark Kowalak, Troy, OH (US); Kirk Neer, St Paris, OH (US); Chih M. Lin, Tipp City, OH (US)

(73) Assignee: CRANE PUMPS & SYSTEMS, INC., Piqua, OH (US)

( * ) Notice: Subject to any disclaimer, the term of this patent is extended or adjusted under 35 U.S.C. 154(b) by 149 days.

(21) Appl. No.: 14/000,553

(22) PCT Filed: Feb. 21, 2012
(Under 37 CFR 1.47)

(86) PCT No.: PCT/US2012/025843
§ 371 (c)(1),
(2), (4) Date: Dec. 18, 2013

(87) PCT Pub. No.: WO2012/115916
PCT Pub. Date: Aug. 30, 2012

(65) Prior Publication Data
US 2015/0021901 A1 Jan. 22, 2015

Related U.S. Application Data

(60) Provisional application No. 61/444,847, filed on Feb. 21, 2011.

(51) Int. Cl.
*F16L 37/26* (2006.01)
*F04D 29/60* (2006.01)

(52) U.S. Cl.
CPC .............. *F04D 29/607* (2013.01); *F16L 37/26* (2013.01)

(58) Field of Classification Search
CPC .................................................. F04D 29/607

USPC ................... 285/325; 417/360, 361
See application file for complete search history.

(56) References Cited

U.S. PATENT DOCUMENTS

| 3,427,982 | A | * | 2/1969 | Englesson | 417/360 |
| 4,324,531 | A | * | 4/1982 | Sarvanne | 417/360 |
| 4,564,041 | A | * | 1/1986 | Kramer | 417/360 |
| 4,886,426 | A | * | 12/1989 | Surinak | 417/360 |
| 5,507,628 | A | * | 4/1996 | Masse et al. | 417/360 |
| 5,658,135 | A | * | 8/1997 | Sodergard | 417/360 |
| 8,414,032 | B2 | * | 4/2013 | Yang | 285/325 |

FOREIGN PATENT DOCUMENTS

| JP | 2003-049790 A | 2/2003 |
| JP | 2004-360625 A | 12/2004 |
| JP | 2007-138608 A | 6/2007 |
| JP | 2008-025514 A | 2/2008 |

* cited by examiner

*Primary Examiner* — David E Bochna
(74) *Attorney, Agent, or Firm* — Standley Law Group LLP

(57) ABSTRACT

A break-away fitting facilitates installation and removal of a pump in wet well system, along at least one guide rail. When installed, the fitting mates an outlet of the pump to an outlet pipe of the wet well. The fitting has a body with a first and a second surface, the surfaces arranged to be substantially perpendicular to each other. A flanged opening in the first surface is sized and adapted for attaching the body to the outlet flange of the pump. The second surface has indentations for engaging the at least one guide rail, so that the body slides in the vertical channel. To minimize the dangers from static electricity in the wet well, the body may be formed from a non-sparking material, such as brass or bronze, or a surface of the indentations may be covered by a non-sparking material, including high-density polyethylene or poly(tetrafluoroethylene).

12 Claims, 2 Drawing Sheets

GUIDE LINER FOR BREAK-AWAY FITTING

CROSS-REFERENCE TO RELATED APPLICATIONS

This application claims a benefit of priority from U.S. provisional patent application 61/444847, filed on 21 Feb. 2011.

TECHNICAL FIELD

The disclosed embodiments of the present invention relate to a guide liner that is useful in association with a break-away fitting, especially a fitting that substantially eliminates explosion hazards that have been known in the prior art. Preferably, the guide liner is non-metallic, and is, in any case, comprises a non-sparking material.

BACKGROUND OF THE ART

Wet wells are used to transfer wastewater, especially sewage liquids. Although gravity is typically employed for this transfer, wet wells are used in the occasions where a pump-assisted pressure lift is required. Wet wells collect wastewater through an influent pipe and contain the wastewater until a sufficient amount for transfer is gathered. A pump, typically a submersible pump, is mounted low in the wet well. When a level-sensing means actuates the pump, the accumulated wastewater is discharged, lifting the wastewater through a pressurized piping arrangement inside the wet well to an effluent pipe, through which the wastewater exits the wet well and continues on its way to a treatment facility.

The wet well almost always has a significant headspace present above the liquids, and the composition of the gases present in the wet well will require the wet well to be considered as a hazardous location, requiring equipment that is rated explosion-proof. Specific equipment requiring this rating includes at least the pump itself (including its associated motor), the level-sensing system and a break away fitting ("BAF") system that connects the high-pressure side of the pump to the pressurized piping system.

The environment of the wet well also requires that maintenance and replacement of components contained in the wet well be done with minimal exposure of personnel to the liquids and vapors. The submersible pumps used in the wet well will inevitably need to be removed and replaced.

The use of a guide rail system for raising or lowering a submersible pump into the wet well is known in the art and is a conventional solution to this problem, as it accommodates the weight of the pump, which can be considerable.

Accordingly, it would be advantageous to provide a wet well system in which the pump may be installed and removed in a manner that does not present a sparkling hazard in a potentially explosive atmosphere.

SUMMARY

This and other unmet advantages are provided by a fitting to install and remove a pump to an outlet pipe of a wet well system having at least one guide rail defining a vertical channel. The fitting has a body with a first and a second surface, arranged substantially perpendicular to each other. A flanged opening is located in the first surface. It is sized and adapted to attach the body to a corresponding outlet flange of the pump. The fitting also has at least one means for engaging the at least one guide rail, such that the body slides in the vertical channel when the pump is installed or removed therealong. The at least one engaging means is arranged on the second surface of the body.

In some embodiments, the fitting also has a means for attaching a chain or cable for raising and lowering the pump, particularly, a bail that extends away from the second surface.

In some embodiments, the body comprises a non-sparking material, particularly, brass or bronze.

In some embodiments, the guide rail-engaging means is provided by a pair of "U" shaped indentations formed in the second surface, each indentation arranged to serve as a female component for mating with a corresponding male component on the guide rails.

In some embodiments, the fitting has a pair of sleeves, each sleeve fitted into one of the "U" shaped indentations, covering the surface of the indentation that would be in contact with one of the guide rails. Each sleeve comprises a non-sparking material, with a metal such as brass or bronze or a polymeric material such as high-density polyethylene or poly(tetrafluoroethylene) being preferred.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION OF A PREFERRED EMBODIMENT

Figure 1:
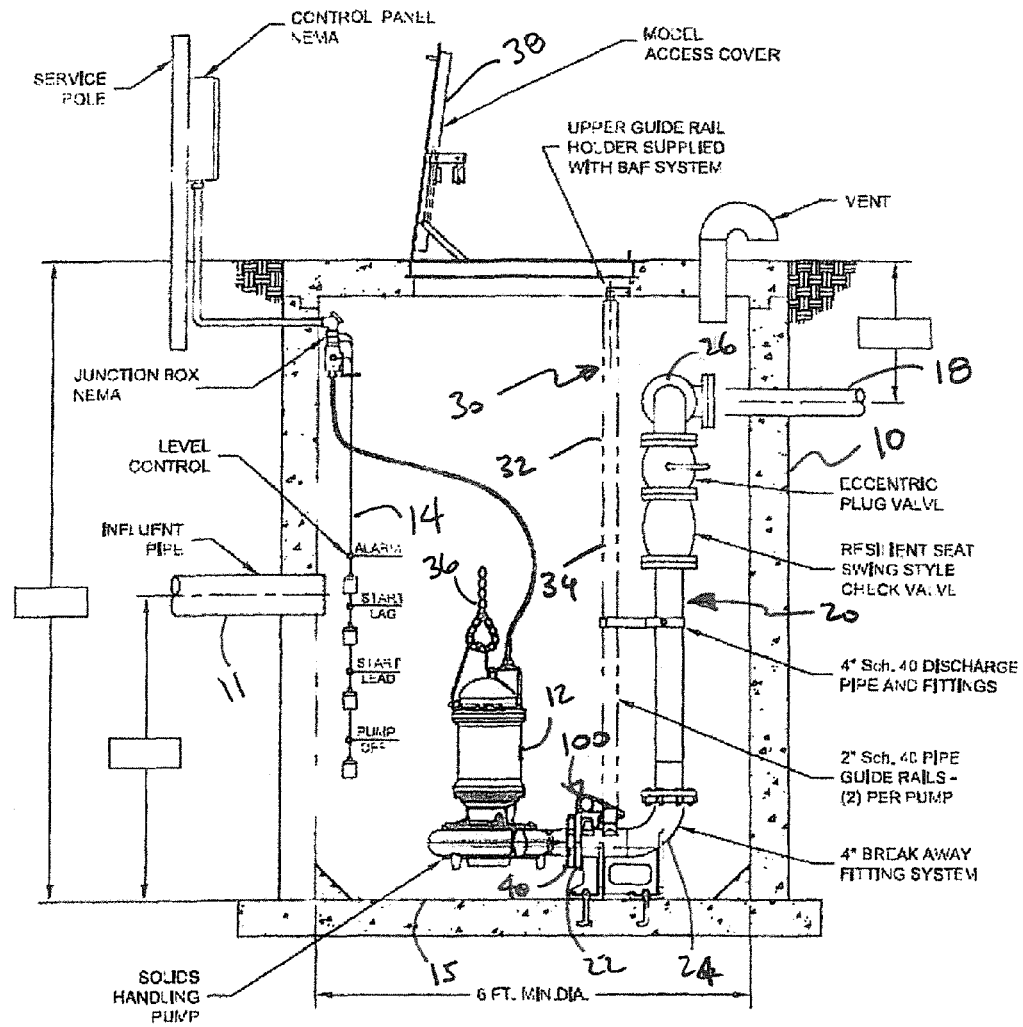
FIG. 1 is a side elevation view of a wet well, in which an embodiment of a break away fitting is installed.

FIG. 1 shows a side elevation depiction of a system that includes a wet well 10, as generally known in the prior art. In this view, the wet well 10 is sectioned, to allow internal aspects to be viewed. In the wet well 10, influent sewage enters through influent pipe 11, typically by gravity flow. Wastewater entering through the influent pipe 11 is contained until a sufficient amount for transfer is gathered. A pump 12, generically depicted in FIG. 1 as a submersible pump, is mounted low in the wet well 10. When a level-sensing means 14 in the wet well 10 detects a liquid level at a threshold level above the wet well floor 15, an actuation signal is sent to the pump 12 and the accumulated wastewater is discharged, lifting the wastewater to an effluent pipe 18 through a pressurized piping arrangement 20 inside the wet well interior. From effluent pipe 18, the pressurized waste exits the wet well 10 and continues on its way to a treatment facility (not depicted). While other features of the wet well 10 are depicted in FIG. 1, they are not particularly pointed out here, as one of skill will understand them without explanation.

As the wet well 10 is almost always arranged to keep the liquid volume relatively low when compared to the gas volume, the gas composition and the significant headspace will require the wet well 10 to be considered as a hazardous location, requiring equipment that is rated explosion-proof. Specific equipment requiring this rating includes at least the pump itself (including its associated motor), the level-sensing system and a break away fitting ("BAF") system 100 that connects the high-pressure side of the pump 12 to the pressurized piping arrangement 20, as will be described now.

Figure 2:
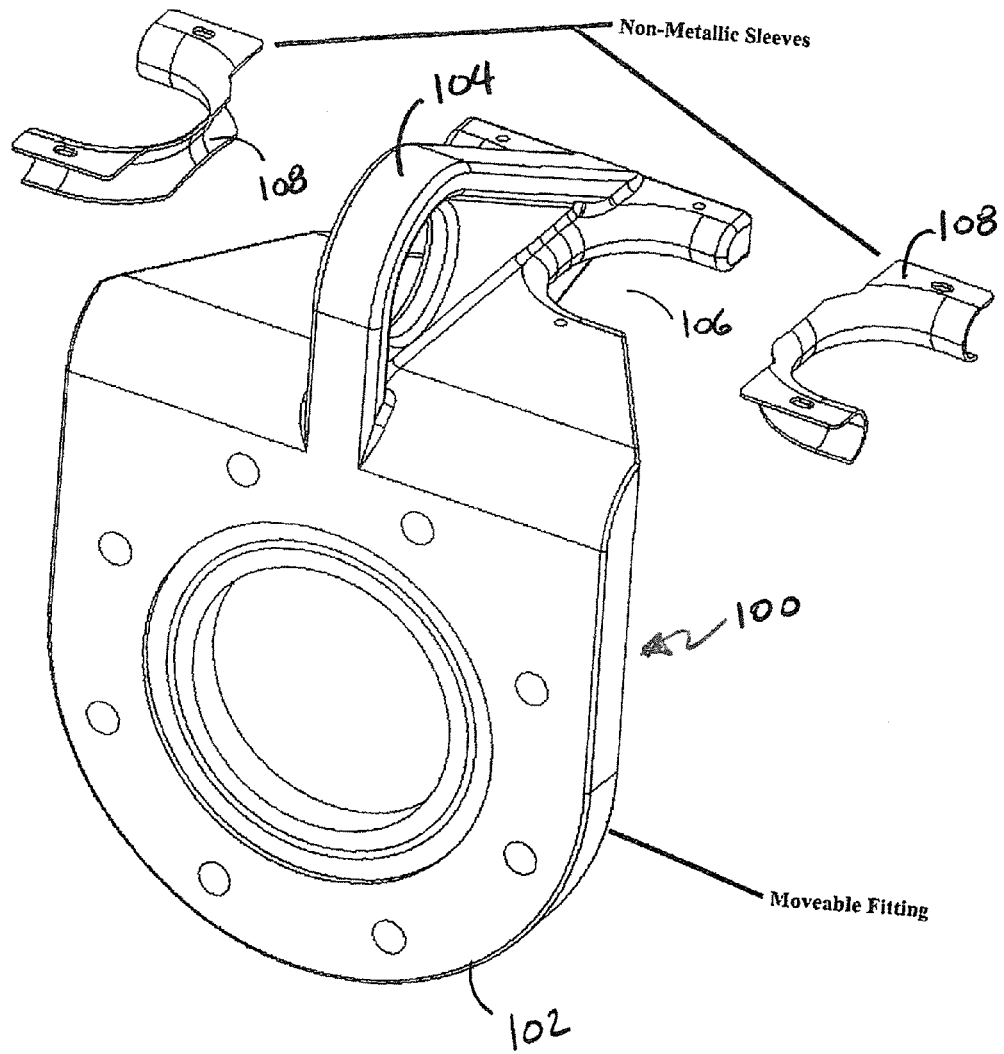
FIG. 2 is an enlarged perspective view of a moveable fitting that is part of the break away fitting.

The installation shown in FIG. 1, and especially as shown further in an enlarged perspective view in FIG. 2, goes beyond the known break-away fitting features. Although a pressurized piping arrangement 20 that conducts the pressurized waste from the pump 12 out of the wet well 10 through effluent pipe 18 is generally considered a low maintenance item that can be relatively permanently placed, the pump 12 is not considered to be low maintenance and should not be permanently placed. As a result of these considerations, a first end 22 of the pressurized piping arrangement 20 comprises a base elbow 24 which is securely mounted to the wet well floor 15, typically by fastening a flanged surface of the elbow to bolts embedded in the floor. Similarly, the individual piping elements, including check and plug valves, that comprise the pressurized piping arrangement 20 are securely fastened to each other and the second end 26 of the arrangement is secured to the effluent pipe 18.

The use of a generic guide rail system for raising or lowering the submersible pump 12 into the wet well 10 is known in the art. It accommodates the weight of the pump 12, which can be considerable. In the particular embodiment described here, the guide rail system 30 comprises first and second guide rails 32, 34, which extend vertically from an access port at the upper end of the wet well 10 to the base elbow 24, the respective guide rails in parallel relationship. A cable or chain 36 is attached to a top portion of the pump 12, for use in raising or lowering the pump into an installed position in the wet well 10 from a point above an access cover 38 of the wet well.

While not the subject of the overall disclosure, the pump 12 will typically be a submersible, solids handling pump with an electric motor housed in an explosion-proof housing. Pump 12 is preferably mounted so that it can rest above the wet well floor 15, thereby allowing an inlet port to be positioned with a few inches of clearance above the floor, preferably in a central location, such as a location that is approximately axial when the wet well has a cylindrical shape. Since this preferable positioning is not practical if the pump actually mounts to the floor, it becomes an acceptable option to use an outlet flange 40 of the pump as the means for connecting the pump to a mount.

At this point, reference can be made to FIG. 2, which depicts an embodiment 100 of the break away fitting. The break away fitting 100 is distinguished by several notable features. These include a flange 102 that is sized and adapted to be mated with the pump outlet flange 40 of FIG. 1, a means 104 for attaching a chain, cable or the like for raising and lowering the break away fitting 100 along a vertical channel defined by the guide rails, and means 106 for engaging the break away fitting in the vertical channel. This engaging means 106 is provided along a top surface of the break away fitting 100, which generally has an inverted "L" shape, with flange 102 being the vertically-oriented arm. In the depicted embodiment, the engaging means 106 is a pair of "U" shaped indentations that serve as the female component in mating with a pair of male components on the guide rails. In an alternative, the engaging means could be a pair of "U" shaped projections that serve as the male component in mating with a pair of female components on the guide rails, although this second option is not as desirable, as it causes the break away fitting 100 to be more massive, meaning that more weight needs to be raised or lowered in using the system. When the attaching means 104 is used for attaching a cable or chain for raising or lowering the pump 12, it will usually be used in addition to, and not instead of, the use of cable 36, as the weight of the pump will be best handled by a cable that is directly attached.

To minimize or eliminate explosion hazards while raising or lowering the break away fitting 100 while a pump is attached to it, two options are available. In a first option, the entire break away fitting is formed from a non-sparking material, preferably a metallic material such as brass or bronze. A second option is to provide a pair of sleeves 108 that cover the surfaces of the break away fitting 100 that would be in contact with the guide rails. These sleeves 108 can be either a metallic non-sparking material (as mentioned above) or a non-metallic material, especially a polymeric material and even more especially a polymeric material, such as a high-density polyethylene ("HDPE"), sold commercially under a variety of trademarks or a poly(tetrafluoroethylene) material that is sold commercially under the registered trademark TEFLON, that not only operates as a dielectric but also reduces friction, further removing a spark hazard.

While the break away fitting 100 is provided with a bail that operates as the attaching means 104, and it will be typically used to attach a chain, cable or the like to raise or lower the fitting along the guide rails 32, 34, this does not mean that this is the only raising or lowering means that would be used. It was be typical practice to also have a second chain or cable attached to the pump 12. It would also be a preferred practice to provide a pair of corresponding mating means 110 on the base elbow 24 and the break away fitting 100 to seat the fitting on the elbow, especially for aligning the flange 40 with the flange that defines the first end 22 of the pressurized piping arrangement 20.

What is claimed is:

1. A fitting to install and remove a pump to an outlet pipe of a wet well system having at least one guide rail defining a vertical channel, the fitting comprising:
    a body having a first and a second surface, the first and second surfaces arranged to be substantially perpendicular to each other;
    a flanged opening, located in the first surface, the flanged opening sized and adapted for attaching the body to a corresponding outlet flange of the pump;
    a means for engaging the at least one guide rail, comprising a pair of "U" shaped indentations formed in the second surface, each indentation arranged to serve as a female component for mating with a corresponding male component on the guide rails, such that the body slides in the vertical channel; and
    a pair of sleeves, each sleeve fitted into one of the "U" shaped indentations, covering the surface of the indentation that would be in contact with one of the guide rails.

2. The fitting of claim 1, wherein:
the body comprises a non-sparking material.

3. The fitting of claim 2, wherein:
the body comprises brass or bronze.

4. The fitting of claim 1, wherein:
each sleeve comprises a polymeric material.

5. The fitting of claim 4, wherein:
each sleeve comprises a high-density polyethylene.

6. The fitting of claim 5, wherein:
the body comprises a non-sparking material.

7. The fitting of claim 6, wherein:
the body comprises brass or bronze.

8. The fitting of claim 4, wherein:
each sleeve comprises a poly(tetrafluoroethylene).

9. The fitting of claim 8, wherein:
the body comprises a non-sparking material.

10. The fitting of claim 9, wherein:
the body comprises brass or bronze.

11. The fitting of claim 4, wherein:
the body comprises a non-sparking material.

12. The fitting of claim 11, wherein:
the body comprises brass or bronze.

* * * * *